United States Patent
Zhu

(10) Patent No.: US 12,477,562 B2
(45) Date of Patent: Nov. 18, 2025

(54) DOWNLINK CONTROL INFORMATION SCHEDULING METHOD AND APPARATUS, AND STORAGE MEDIUM

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 354 days.

(21) Appl. No.: 18/031,614

(22) PCT Filed: Oct. 13, 2020

(86) PCT No.: PCT/CN2020/120698
§ 371 (c)(1),
(2) Date: Apr. 13, 2023

(87) PCT Pub. No.: WO2022/077234
PCT Pub. Date: Apr. 21, 2022

(65) Prior Publication Data
US 2023/0389041 A1    Nov. 30, 2023

(51) Int. Cl.
*H04W 72/232*    (2023.01)
*H04W 72/12*    (2023.01)

(52) U.S. Cl.
CPC ......... *H04W 72/232* (2023.01); *H04W 72/12* (2013.01)

(58) Field of Classification Search
CPC .. H04W 72/232; H04W 72/12; H04L 5/0044; H04L 5/0094
See application file for complete search history.

(56) References Cited

U.S. PATENT DOCUMENTS

| | | | |
|---|---|---|---|
| 11,108,613 B2* | 8/2021 | Manolakos | H04L 27/261 |
| 2015/0172015 A1 | 6/2015 | Won et al. | |
| 2019/0052432 A1 | 2/2019 | Islam et al. | |
| 2020/0136776 A1* | 4/2020 | Wang | H04W 72/23 |
| 2021/0014883 A1* | 1/2021 | Khoshnevisan | H04L 1/1896 |

(Continued)

FOREIGN PATENT DOCUMENTS

| CN | 108243503 A | 7/2018 |
|---|---|---|
| CN | 109995497 A | 7/2019 |

(Continued)

OTHER PUBLICATIONS

CNOA of Application No. 202080002743.6 dated on Feb. 13, 2025 with English translation, (21p).

(Continued)

*Primary Examiner* — Kibrom T Hailu
(74) *Attorney, Agent, or Firm* — Arch & Lake LLP

(57) ABSTRACT

The present application provides a method and device for scheduling downlink control information. The method for scheduling the downlink control information includes determining joint downlink control information, the joint downlink control information being determined on basis of two or more pieces of member downlink control information. Each piece of member downlink control information corresponds to scheduling of one data channel, and the joint downlink control information is designed to schedule a plurality of data channels corresponding to the two or more pieces of member downlink control information.

14 Claims, 6 Drawing Sheets

(56) References Cited

U.S. PATENT DOCUMENTS

| | | | | |
|---|---|---|---|---|
| 2021/0243751 A1* | 8/2021 | Saber | | H04W 72/21 |
| 2022/0052727 A1* | 2/2022 | Sun | | H04L 1/1887 |
| 2022/0070855 A1* | 3/2022 | Zhang | | H04W 72/51 |
| 2022/0167321 A1* | 5/2022 | Zhang | | H04W 72/23 |
| 2022/0294591 A1* | 9/2022 | Liu | | H04L 5/0053 |
| 2022/0312485 A1* | 9/2022 | Zhang | | H04W 72/53 |
| 2022/0337381 A1* | 10/2022 | Liu | | H04L 1/0015 |
| 2023/0308249 A1* | 9/2023 | Matsumura | | H04L 5/0053 |

FOREIGN PATENT DOCUMENTS

| | | | |
|---|---|---|---|
| CN | 110225591 A | 9/2019 | |
| CN | 111356242 A | 6/2020 | |
| WO | 2014157996 A1 | 10/2014 | |
| WO | 2018098683 A1 | 6/2018 | |

OTHER PUBLICATIONS

International Search Report of PCT/CN2020/120698 dated Jun. 28, 2021 with English translation, (5p).
Qualcomm Incorporated, "Discussion on DCI related issues", 3GPP TSG RAN WG1 Meeting AH 1801, R1-1800870, Vancouver, Canada, Jan. 22-26, 2018, (3p).
ZTE, "Discussion on Multi-cell PDSCH Scheduling via a Single DCI", 3GPP TSG RAN WG1 Meeting #102-e, R1-2005441, e-Meeting, Aug. 17-28, 2020, (8p).
Qualcomm Incorporated, "Views on multi-cell PDSCH scheduling via a single DCI", 3GPP TSG-RAN WG1 #102-e, R1-2006834, e-Meeting, Aug. 17-28, 2020, (5p).
Extended European Search Report of EP Application No. 20957015.9 dated Jun. 4, 2024, (10p).

* cited by examiner

Determining the joint DCI, where the joint DCI is determined on basis of two or more member DCIs, each member DCI corresponds to scheduling of one data channel, and the joint DCI is used to schedule a plurality of data channels corresponding to two or more member DCIs — S11

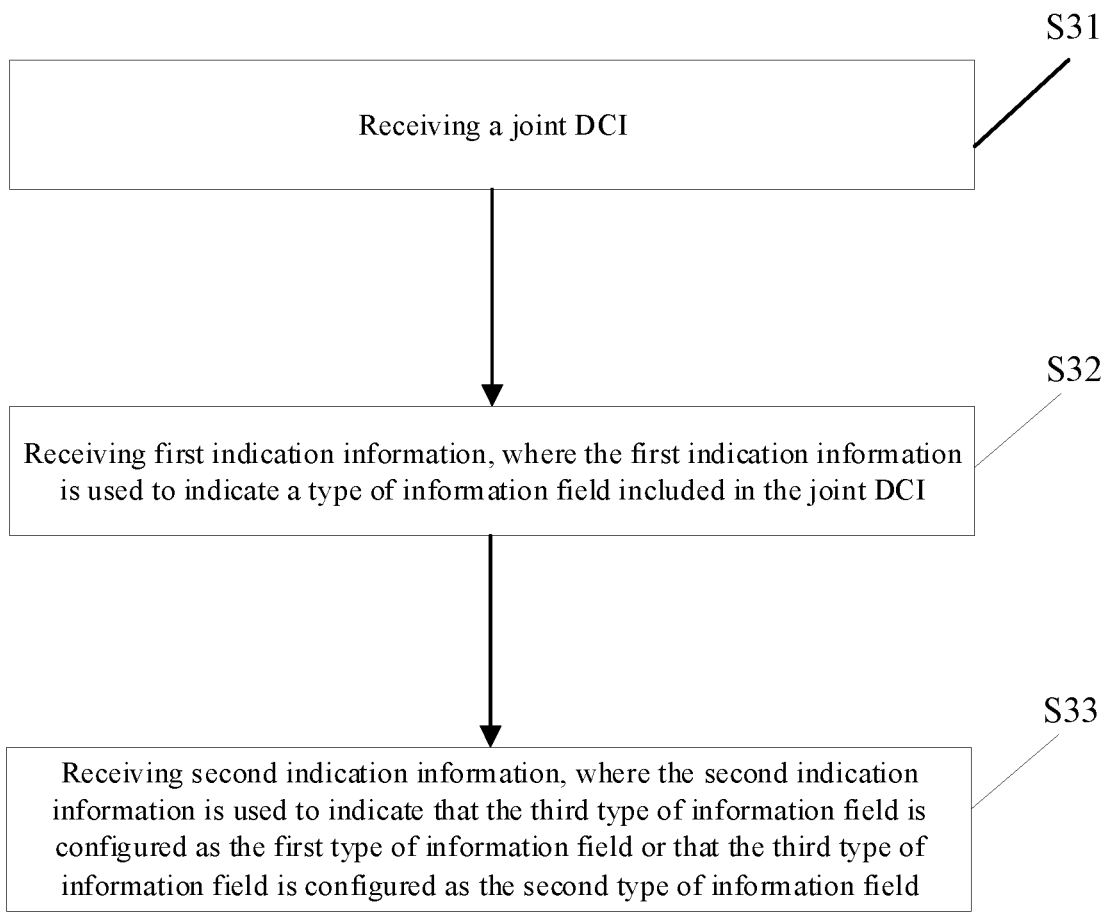

DOWNLINK CONTROL INFORMATION SCHEDULING METHOD AND APPARATUS, AND STORAGE MEDIUM

CROSS-REFERENCE TO RELATED APPLICATION

The present application is the U.S. National phase application of International Application No. PCT/CN2020/120698, filed on Oct. 13, 2020, the entire content of which is incorporated herein by reference for all purposes.

TECHNICAL FIELD

The present disclosure relates to the field of communication technology, and in particular, to a method and device for scheduling downlink control information (DCI), and storage medium.

BACKGROUND

The emergence of a new generation of Augmented Reality (AR) or Virtual Reality (VR), Vehicle-to-Vehicle (V2V) communication and other new Internet applications has put forward higher requirements for wireless communication technology, driving the evolution of wireless communication technology to meet the needs of applications. At present, cellular mobile communication technology is in the evolutionary stage of the new generation technology. An important feature of the new generation technology is to support the flexible configuration of multiple service types. Different service types have different requirements for wireless communication technology. Therefore, the new generation of wireless communication system needs a flexible and configurable design to support the transmission of multiple service types.

SUMMARY

The present disclosure provides a method and device for scheduling downlink control information, and storage medium.

According to a first aspect of embodiments of the present disclosure, there is provided a method for scheduling downlink control information applied to a network device, including:
determining joint downlink control information, the joint downlink control information being determined on basis of two or more pieces of member downlink control information; where each piece of member downlink control information corresponds to scheduling of one data channel, and the joint downlink control information is designed to schedule a plurality of data channels corresponding to the two or more pieces of member downlink control information.

According to a second aspect of embodiments of the present disclosure, there is provided a method for scheduling downlink control information applied to a terminal, including:
receiving joint downlink control information, the joint downlink control information being determined on basis of two or more pieces of member downlink control information; where each piece of member downlink control information corresponds to scheduling of one data channel, and the joint downlink control information is designed to schedule a plurality of data channels corresponding to the two or more pieces of member downlink control information.

According to a third aspect of embodiments of the present disclosure, there is provided a device for scheduling downlink control information, including:
a processor, and memory for storing instructions executable by the processor;
where the processor is configured to perform the method for scheduling the downlink control information described in the first aspect.

According to a fourth aspect of embodiments of the present disclosure, there is provided a device for scheduling downlink control information, including:
a processor, and memory for storing instructions executable by the processor;
where the processor is configured to perform the method for scheduling the downlink control information described in the second aspect.

According to a fifth aspect of embodiments of the present disclosure, there is provided a non-transitory computer readable storage medium, where instructions in the storage medium, when executed by a processor of a network device, cause the network device to perform the method for scheduling the downlink control information described in the first aspect.

According to a sixth aspect of an embodiment of the present disclosure, there is provided a non-transitory computer readable storage medium, where instructions in the storage medium, when executed by a processor of a mobile terminal, cause the mobile terminal to perform the method for scheduling the downlink control information described in the second aspect.

It should be understood that the foregoing general description and the following detailed descriptions are exemplary and explanatory only and do not limit the present disclosure.

BRIEF DESCRIPTION OF THE DRAWINGS

The accompanying drawings herein are incorporated into and form part of the specification, illustrate embodiments consistent with the present disclosure, and are used to explain the principles of the present disclosure in conjunction with the specification.

FIG. 5 is a flow chart of a method for scheduling DCI illustrated according to an exemplary embodiment.

FIG. 6 is a flow chart of a method for scheduling DCI illustrated according to an exemplary embodiment.

DETAILED DESCRIPTION

Exemplary embodiments will be described herein in detail, examples of which are represented in the accompanying drawings. When the following description relates to the accompanying drawings, the same numerals in different accompanying drawings indicate the same or similar elements unless otherwise indicated. The embodiments described in the following exemplary embodiments do not represent all embodiments that are consistent with the present disclosure. Rather, they are only examples of devices and methods that are consistent with some aspects of the present disclosure, as detailed in the appended claims.

Figures 1, 2:
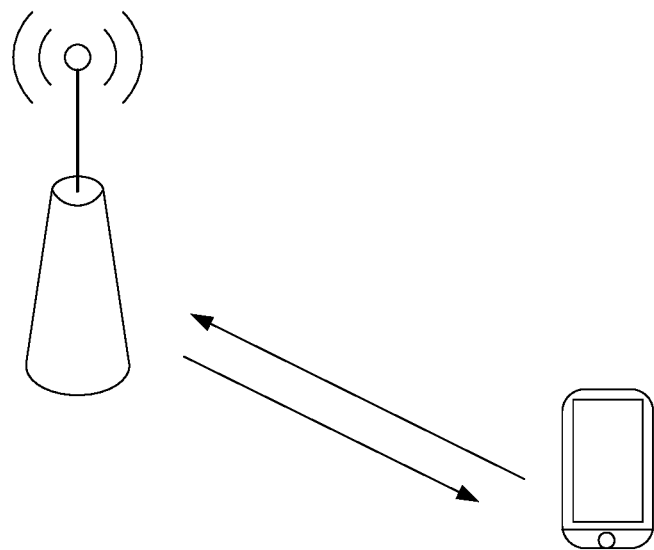
FIG. 1 is a diagram illustrating the architecture of a wireless communication system according to an exemplary embodiment.
FIG. 2 is a flow chart of a method for scheduling DCI illustrated according to an exemplary embodiment.

The method for scheduling the downlink control information provided by embodiments of the present disclosure may be applied in the wireless communication system shown in FIG. 1. Referring to FIG. 1, a terminal, and a network device are included in the wireless communication system. Information is sent and received between the terminal and the network device via wireless resources.

It will be understood that the wireless communication system shown in FIG. 1 is illustrated schematically only, and other network devices may be included in the wireless communication system, such as core network device, wireless relay equipment, and wireless backhaul equipment, etc., which are not shown in FIG. 1. Embodiments of the present disclosure do not limit the number of network devices and the number of terminals included in the wireless communication system.

It will be further understood that the wireless communication system of embodiments of the present disclosure is a network that provides wireless communication functions. The wireless communication system may employ different communication technologies, such as code division multiple access (CDMA), wideband code division multiple access (WCDMA), time division multiple access (TDMA), frequency division multiple access (FDMA), orthogonal frequency-division multiple access (OFDMA), single Carrier FDMA (SC-FDMA), and Carrier Sense Multiple Access with Collision Avoidance (CSMA/CA). Depending on the capacity, rate, and delay of different networks, the network can be classified as a $2^{nd}$ generation (2G) network, a 3G network, a 4G network, or a future evolutionary network such as a 5G network, which can also be called a New Radio (NR) network. For the convenience of description, in some parts of this disclosure, the wireless communication network will be referred to simply as network.

Further, the network device involved in the present disclosure may also be referred to as wireless access network device. The wireless access network device may be a base station, an evolved base station (i.e., evolved node B or eNB), a home base station, an access point (AP) in a wireless fidelity (WIFI) system, a wireless relay node, a wireless backhaul node, a transmission point (TP) or a transmission and reception point (TRP), etc. It can also be a gNB in a NR system, or a component or part of a device that constitutes a base station, etc. The network device may also be in-vehicle equipment when it is in a vehicle-to-everything (V2X) communication system. It should be understood that in the embodiments of the present disclosure, the specific technology and the specific equipment form used for the network device are not limited.

Further, the terminal involved in the present disclosure, which may also be referred to as terminal equipment, User Equipment (UE), Mobile Station (MS), Mobile Terminal (MT), etc., is the equipment that provides voice and/or data connectivity to a user. For example, the terminal may be handheld equipment or in-vehicle equipment with wireless connectivity, etc. Currently, some examples of terminals include Mobile Phone, Pocket Personal Computer (PPC), Pocket PC, Personal Digital Assistant (PDA), laptop, tablet, wearable equipment, or in-vehicle equipment, etc. In addition, the terminal equipment may also be the in-vehicle equipment when it is in the V2X communication system. It should be understood that in the embodiments of the present disclosure, the specific technology and the specific equipment form used for the terminal are not limited.

The emergence of a new generation of AR or VR, V2V communication and other new Internet applications has put forward higher requirements for wireless communication technology, driving the evolution of wireless communication technology to meet the needs of applications. At present, cellular mobile communication technology is in the evolutionary stage of the new generation technology. An important feature of the new generation technology is to support the flexible configuration of multiple service types. Different service types have different requirements for wireless communication technology. For example, enhanced Mobile Broad Band (enhanced Mobile Broad Band, eMBB) services focus on large bandwidth, high speed, etc.; Ultra Reliable Low Latency Communication (URLLC) services focus on high reliability and low latency; and massive Machine Type Communication (mMTC) services focus on large number of connections. Therefore, the new generation of wireless communication system needs a flexible and configurable design to support the transmission of multiple service types.

Initial deployment of the new generation mobile communication technology typically occurs in areas with high traffic density and high demand for new services, and then gradually expands the coverage. During the gradual deployment of new access technology, mixed coverage of new and old technologies becomes an inevitable requirement for the operator's network. Even in areas where the new technology has been deployed, it is often necessary to retain the older technology and to coexist for a significant period of time to ensure continued service for older devices that do not support the new technology. 5G NR can be deployed in the same spectrum as LTE, thus sharing spectrum dynamically between the two technologies, with high spectrum utilization. Dynamic spectrum sharing (DSS) provides a very useful migration path from LTE to 5G NR by allowing Long Term Evolution (LTE) and New Radio (NR) to share the same carrier. As the number of 5GNR devices in the network increases, ensuring sufficient scheduling capacity for 5G NR terminals is an urgent problem to be solved.

The embodiments of the present disclosure are illustrated with 5G NR network as an example, where the 5G NR network supports carrier aggregation. At present, the 5G NR network supports one DCI to schedule one physical downlink shared channel (PDSCH) or one physical uplink shared channel (PUSCH) in the case of carrier aggregation, and does not support one DCI to schedule a plurality of PDSCHs or a plurality of PUSCHs. When the Primary cell (PCell) or Primary secondary cell (PSCell) of 5GNR and PCell or PSCell of LTE shares carriers, it is easy to cause a shortage of PDCCH resources which prevents effective resource scheduling.

In view of above, embodiments of the present disclosure provide a method for scheduling DCI applicable to a carrier aggregation-based scenario. In this method, a scheme of scheduling a plurality of PDSCHs or PUSCHs using one DCI is provided. The present disclosure enables flexible configuration of DCI formats according to the scenario, which can effectively reduce the overhead of scheduling resources while taking into account the effectiveness.

For the convenience of description, the DCI that schedules one data channel (PDSCH/PUSCH) is referred to as a member DCI in the embodiments of the present disclosure, where one member DCI corresponds to the scheduling of one data channel. The DCI that schedules a plurality of data channels is referred to as a joint DCI, where one joint DCI corresponds to the scheduling of a plurality of data channels corresponding to two or more member DCIs. That is, the joint DCI can also be understood as being generated by combining one or more member DCIs, with each member DCI scheduling one data channel.

FIG. 2 is a flow chart of a method for scheduling DCI illustrated according to an exemplary embodiment. As shown in FIG. 2, the method for scheduling the DCI is used in a network device and includes the following steps.

Step S11, determining the joint downlink control information (DCI).

The joint DCI is determined on basis of two or more pieces of member downlink control information (DCI). That is, the joint DCI is obtained by combining a plurality of member DCIs. Each member DCI corresponds to scheduling of one data channel, and the data channel scheduled by the member DCI can be a PDSCH or a PUSCH. The joint DCI is used to schedule a plurality of data channels corresponding to two or more member DCIs.

In the embodiments of the present disclosure, the format of the joint DCI may be determined based on the information fields included in the member DCI. Here, the information field may also be understood as a field included in the DCI.

In one embodiment, the information fields in the member DCI that are combined as the joint DCI, are divided into three categories in this embodiment of the disclosure, namely, a first type of information field, a second type of information field, and a third type of information field.

The first type of information field is an information field shared by two or more pieces of member downlink control information. The second type of information field is an information field provided for each piece of member downlink control information in the two or more pieces of member downlink control information. The third type of information field has a specified default configuration type and/or the third type of information field is configured as the first type of information field or the second type of information field. The default configuration type is defaulted to either the first type of information field or the second type of information field.

Further, the information field included in the joint DCI determined based on the member DCI(s) in the embodiments of the disclosure may be the first type of information filed, and/or the second type of information field, and/or the third type of information field.

The first type of information field can be understood as a "common" information field. The joint DCI determined based on the member DCIs may include one first type of information field, and a plurality of member DCIs share the first type of information field. The second type of information field can be understood as an "independent" information field. The joint DCI determined based on the member DCIs may include a plurality of second type of information fields, and each member DCI has its own corresponding "independent" second type of information field. The third type of information field can be understood as a "flexible" information field, which can be either an "independent" information field or a "common" information field, and whether the third type of information field is an "independent" information field or a "common" information field can be configured by default or further configured by the network device based on signaling.

In the embodiments of the present disclosure, the network device can determine the type of information field included in the joint DCI and inform the terminal of the determined type of information field.

In one embodiment, the network device configures the type of information field included in the joint DCI and informs the terminal about it via signaling.

Figure 3:
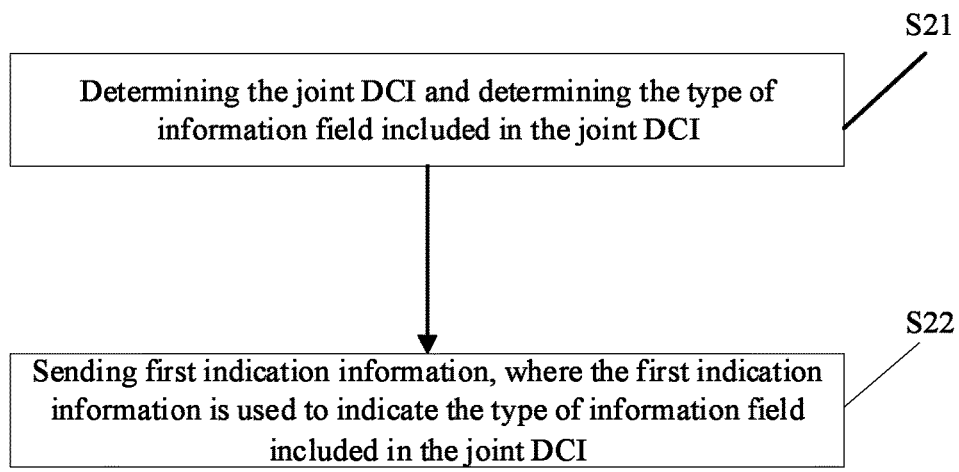
FIG. 3 is a flow chart of a method for scheduling DCI illustrated according to an exemplary embodiment.

FIG. 3 is a flow chart of a method for scheduling DCI illustrated according to an exemplary embodiment. As shown in FIG. 3, the method for scheduling the DCI is used in a network device and includes the following steps.

Step S21, determining the joint DCI and determining the type of information field included in the joint DCI.

Step S22, sending first indication information, where the first indication information is used to indicate the type of information field included in the joint DCI.

In the embodiments of the present disclosure, the first indication information may be carried in high-layer signaling sent by the network device. For example, the high-layer signaling may be Radio Resource Control (RRC) signaling.

In one embodiment, the network device configures the type of information field included in the joint DCI via high-layer signaling (e.g., RRC signaling), and the type of information field included in the joint DCI may be the first type of information field, and/or the second type of information field. The first type of information field is an information field shared by two or more member DCIs. The second type of information field is an information field provided for each member DCI of the two or more member DCIs.

In one embodiment, the first type of information field includes a portion indicated by configuring the third type of information field, and/or the second type of information field includes a portion indicated by configuring the third type of information field. The third type of information field has a specified default configuration type and/or the third type of information field is configured as the first type of information field or the second type of information field. The default configuration type is defaulted to either the first type of information field or the second type of information field.

In the embodiments of the present disclosure, when the third type of information field is included in the joint DCI, the network device may further inform the terminal via signaling that the actual type of information domain configured for the third type of information field is the first type of information field or the second type of information field.

Figure 4:
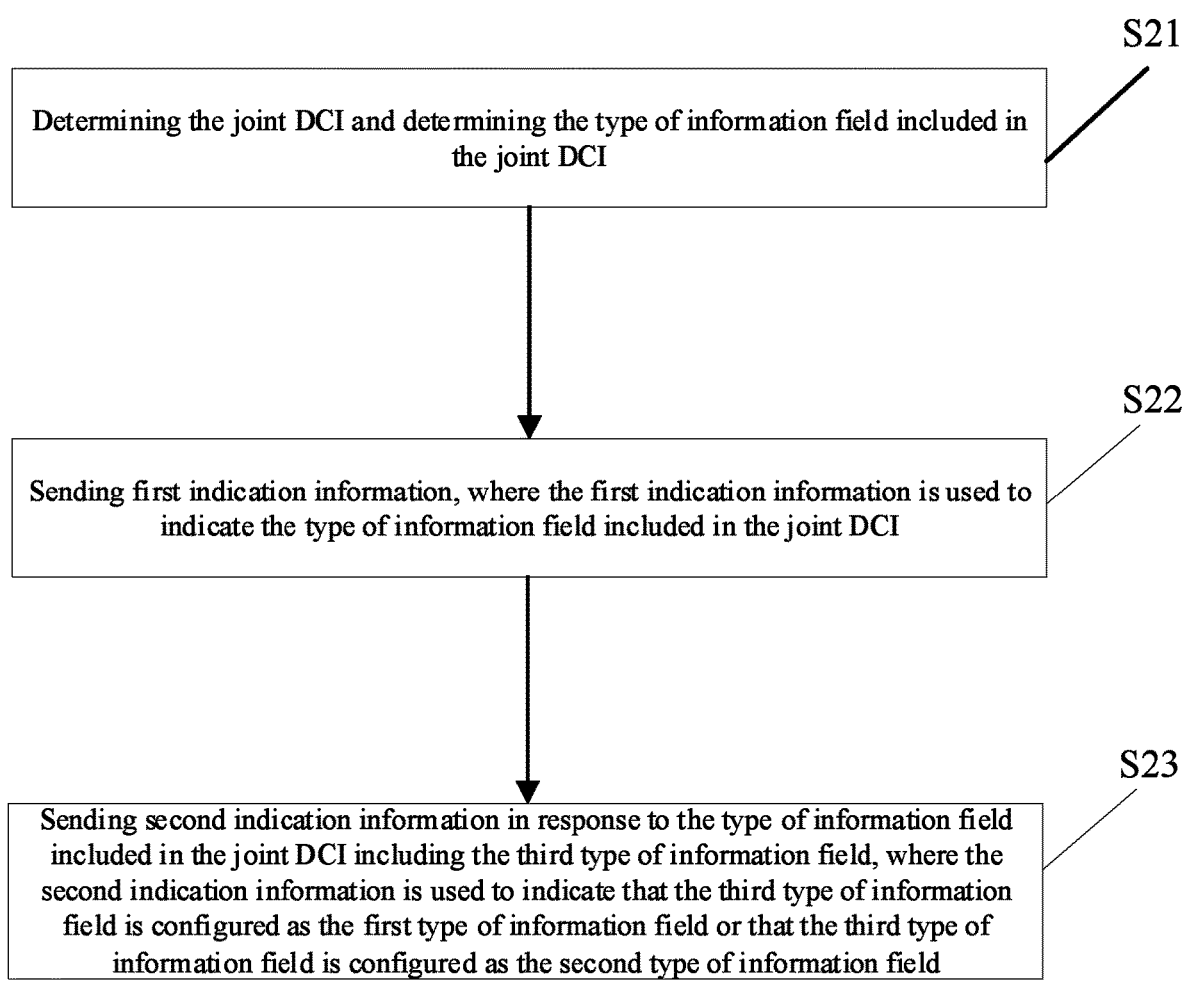
FIG. 4 is a flow chart of a method for scheduling DCI illustrated according to an exemplary embodiment.

FIG. 4 is a flow chart of a method for scheduling DCI illustrated according to an exemplary embodiment. As shown in FIG. 4. The method for scheduling the DCI is used in a network device and further includes the following steps.

Step S23, sending second indication information in response to the type of information field included in the joint DCI including the third type of information field, where the second indication information is used to indicate that the third type of information field is configured as the first type of information field or that the third type of information field is configured as the second type of information field.

The second indication information can be carried through the Media Access Control Control Element (MAC CE) or a new information field added in the joint DCI.

In an example, the network device indicates whether the third type of information field is the first type of information field or the second type of information field by MAC CE or adding field(s) to the joint DCI format, and informs the terminal of the relevant configuration information.

In the embodiments of the present disclosure, the second indication information may indicate whether the third type of information field is the first type of information field or the second type of information field by means of a bitmap. That is, the second indication information includes a bitmap for indicating the first type of information field or the second type of information field. In the second indication information, different bit values of the bitmap can indicate that the third type of information field is configured as the first type of information field, or the second type of information field. That is, a first bit value of the bitmap included in the second indication information indicates that the third type of information field is configured as the first type of information field, and a second bit value of the bitmap indicates that the third type of information field is configured as the second type of information field.

In an example, the bitmap includes one bit. That is, the third type of information field of a DCI field is indicated by one bit. When the corresponding bit value is "0", it is indicated that the DCI field (third type of information field) is "independent" (second type of information field); and when the corresponding bit value is "1", it is indicated that the DCI field (third type of information field) is "common" (first type of information field). Alternatively, when the corresponding bit value is "0", it is indicated that the DCI field (third type of information field) is "common" (first type of information field); and when the corresponding bit value is "1", it is indicated that the DCI field (third type of information field) is "independent" (second type of information field).

In the embodiments of the present disclosure, the network device needs to determine or confirm that the terminal has sent the feedback information of a data channel carrying the MAC CE in the case where the second indication information is carried in the MAC CE. It will be understood that when the network device uses MAC CE to further indicate that the third type of information field is configured as the first type of information field or the second type of information field, the network device starts to activate the configuration of the new joint DCI format after the terminal sends the feedback information (e.g., Hybrid Automatic Repeat reQuest Acknowledgement, HARQ-ACK) of the PDSCH carrying MAC CE.

In the embodiments of the present disclosure, since the third type of information field is a "flexible" field, which is actually configured as the first type of information field or the second type of information field, the type of information field included in the joint DCI in the embodiments of the present disclosure finally includes the first type of information field and/or the second type of information field.

The type of information field(s) included in the joint DCI in the embodiments of the present disclosure may be configured by the network device, i.e., the format of the joint DCI is configured by the network device. Here, the first type of information field and/or the second type of information field included in the joint DCI have a corresponding combination order.

In one example, the type of information field included in the joint DCI includes the first type of information field and the second type of information field, the first type of information field and the second type of information field having a first combination order. In one embodiment, the first combination order is specified by a protocol or determined by the network device.

In one embodiment, the first combination order is determined by the network device, and the network device informs the terminal of the first combination order via high-layer signaling.

The following embodiments of the present disclosure illustrate the first combination order with practical applications.

In one embodiment, at least a first member DCI is included in the two or more member DCIs, and the first combination order includes one of the following combination orders.

Combination order 1: first type of information fields and second type of information fields are arranged in sequence, and the first type of information fields in the two or more member DCIs are arranged sequentially based on an order of first type of information fields in the first member DCI; the second type of information fields in the two or more member DCIs are arranged sequentially based on an order of second type of information fields in the first member DCI; and separately existing information fields in the two or more member DCIs are arranged sequentially based on an order of information fields in member DCI to which the separately existing information fields belong.

In an example, taking 1 joint DCI for scheduling 2 PDSCHs or 2 PUSCHs as an example for illustration, the combination order 1 can be understood as follows: the common fields are arranged sequentially based on the order of the fields in the first one member DCI (or the second one member DCI); then all independent fields in the first one member DCI are arranged sequentially, and then all independent fields in the second one member DCI are arranged sequentially.

Combination order 2: first type of information fields, second type of information fields characterizing a same object, and separately existing second type of information fields are arranged sequentially, and the first type of information fields in the two or more member DCIs are arranged sequentially based on an order of first type of information fields in the first member DCI; the second type of information fields characterizing the same object in the two or more member DCIs are arranged in a staggered order; and separately existing second type of information fields in the two or more member DCIs are arranged sequentially based on an order of information fields in member DCI to which the separately existing second type of information fields belong.

In an example, taking 1 joint DCI for scheduling 2 PDSCHs or 2 PUSCHs as an example for illustration, the combination order 2 can be understood as follows: the common fields are arranged sequentially based on the order of the fields in the first one member DCI (or the second one member DCI); then the independent fields in the first one member DCI and the second one member DCI are staggered; and the fields that are not paired are placed last sequentially.

Combination order 3: second type of information fields characterizing a same object, first type of information fields, and separately existing second type of information fields are arranged sequentially, and the second type of information fields characterizing the same object in the two or more member DCIs are arranged in a staggered order; the first type of information fields in the two or more member DCIs are arranged sequentially based on an order of first type of information fields in the first member DCI; and separately existing second type of information fields in the two or more member DCIs are arranged sequentially based on an order of information fields in member DCI to which the separately existing second type of information fields belong.

In an example, taking 1 joint DCI for scheduling 2 PDSCHs or 2 PUSCHs as an example for illustration, the combination order 3 can be understood as follows: the independent fields in the first one member DCI and the second one member DCI are staggered; the common fields are arranged sequentially based on the order of the fields in the first one member DCI (or the second one member DCI); and the fields that are not paired are placed last sequentially.

Combination order 4: separately existing information fields, second type of information fields characterizing a same object, and first type of information fields are arranged sequentially, and separately existing second type of information fields in the two or more member DCIs are arranged sequentially based on an order of information fields in member DCI to which the separately existing second type of information fields belong; the second type of information fields characterizing the same object in the two or more member DCIs are arranged in a staggered order; and the first type of information fields in the two or more member DCI are arranged sequentially based on an order of first type of information fields in the first member DCI.

In an example, taking 1 joint DCI scheduling 2 PDSCHs or 2 PUSCHs as an example for illustration, the combination order 4 can be understood as follows: the fields that exist separately are arranged sequentially; the independent fields of the first one member DCI and the second one member DCI are then staggered; and the common fields are arranged sequentially based on the order of the fields of the first one member DCI (or the second one member DCI).

In the embodiments of the present disclosure, after the network device configures the joint DCI format and combination order, the terminal can be informed of the joint DCI format and combination order through high-signal signaling (e.g., RRC signaling or MAC CE signaling).

The method of DCI scheduling by the network device provided by embodiments of the present disclosure allows flexible configuration of DCI formats according to scenarios, and can effectively reduce the overhead of scheduling resources while taking into account the effectiveness of communication.

It will be understood that in the embodiments of the present disclosure, after determining the joint DCI, the network device can send the joint DCI to the terminal.

FIG. 5 is a flow chart of a method for scheduling DCI illustrated according to an exemplary embodiment. As shown in FIG. 5, the method for scheduling DCI is used in a terminal and includes the following steps.

Step S31, receiving a joint DCI.

The joint DCI is determined on basis of two or more member DCIs, each member DCI corresponds to scheduling of one data channel, and the joint DCI is used to schedule a plurality of data channels corresponding to two or more member DCIs.

In one embodiment, the joint DCI includes a first type of information field, and/or a second type of information field, and/or a third type of information field. The first type of information field is an information filed shared by two or more member DCIs. The second type of information field is an information field provided for each member DCI of the two or more member DCIs. The third type of information field has a specified default configuration type and/or the third type of information field is configured as the first type of information field or the second type of information field.

FIG. 6 is a flow chart of a method for scheduling DCI illustrated according to an exemplary embodiment. As shown in FIG. 6, the method for scheduling DCI is used in a terminal and includes the following steps.

Step S32, receiving first indication information, where the first indication information is used to indicate a type of information field included in the joint DCI.

In one embodiment, receiving the first indication information includes: receiving the first indication information based on high-layer signaling.

In one embodiment, the type of information domain included in the joint DCI includes the third type of information field, and the method for scheduling DCI further includes step S33.

Step S33, receiving second indication information, where the second indication information is used to indicate that the third type of information field is configured as the first type of information field or that the third type of information field is configured as the second type of information field.

In one embodiment, the second indication information is carried via a MAC CE or an information field in the joint DCI.

In one embodiment, the second indication information includes a bitmap for indicating the first type of information field or the second type of information field; and a first bit value of the bitmap indicates that the third type of information field is configured as the first type of information field, and a second bit value of the bitmap indicates that the third type of information field is configured as the second type of information field.

In one embodiment, the type of information field included in the joint DCI includes the first type of information field and the second type of information field, the first type of information field and the second type of information field having a first combination order.

In one embodiment, at least a first member DCI is included in the two or more member DCIs, and the first combination order includes one of the following combination orders:

first type of information fields and second type of information fields are arranged in sequence, and the first type of information fields in the two or more member DCIs are arranged sequentially based on an order of first type of information fields in the first member DCI; the second type of information fields in the two or more member DCIs are arranged sequentially based on an order of second type of information fields in the first member DCI; and separately existing information fields in the two or more member DCI are arranged sequentially based on an order of information fields in member DCI to which the separately existing information fields belong;

first type of information fields, second type of information fields characterizing a same object, and separately existing second type of information fields are arranged sequentially, and the first type of information fields in the two or more member DCIs are arranged sequentially based on an order of first type of information fields in the first member DCI; the second type of information fields characterizing the same object in the two or more member DCIs are arranged in a staggered order; and separately existing second type of information fields in the two or more member DCIs are arranged sequentially based on an order of information fields in member DCI to which the separately existing second type of information fields belong;

second type of information fields characterizing a same object, first type of information fields, and separately existing second type of information fields are arranged sequentially, and the second type of information fields characterizing the same object in the two or more member DCIs are arranged in a staggered order; the first type of information fields in the two or more member DCIs are arranged sequentially based on an order of first type of information fields in the first member DCI; and separately existing second type of information fields in the two or more member DCIs are arranged sequentially based on an order of information fields in member DCI to which the separately existing second type of information fields belong; and separately existing information fields, second type of information fields characterizing a same object, and first type of information fields are arranged sequentially, and separately existing second type of information fields in the two or more member DCIs are arranged sequentially based on an order of second type of information fields in the first member DCI; the second type of information fields characterizing the same object in the two or more member DCIs are arranged in a staggered order; and the first type of information fields in the two or more member DCIs are arranged sequentially based on an order of first type of information fields in the first member DCI.

In one embodiment, the first combination order is specified by a protocol, or determined by a network device.

In one embodiment, the first combination order is determined by the network device, and the method for scheduling the DCI further includes: determining the first combination order via high-layer signaling.

In one embodiment, the second indication information is carried in the MAC CE, and the terminal is required to send feedback information of a data channel carrying the MAC CE. That is, in the case that the network device uses MAC CE to further indicate that the third type of information field is configured as the first type of information field or the second type of information field, the network device starts to activate the configuration of the new joint DCI format after the terminal sends the feedback information (e.g., HARQ-ACK) of the PDSCH carrying MAC CE.

It will be understood that the method for scheduling the DCI provided by the embodiments of the present disclosure is also applicable to the process of interaction between the terminal and the network device. The process of joint DCI configuration and use during the interaction between the network device and the terminal to achieve DCI scheduling is not detailed here, but can be referred to the corresponding functions implemented by the network device and the terminal respectively in the above embodiments.

Based on the same idea, embodiments of the present disclosure further provide an apparatus for scheduling DCI.

It will be understood that the apparatus for scheduling the DCI provided by embodiments of the present disclosure contains hardware structures and/or software modules that perform the respective functions in order to achieve the aforementioned functions. In combination with the units and algorithmic steps of each example disclosed in the embodiments of the present disclosure, the embodiments of the present disclosure can be implemented in the form of hardware or a combination of hardware and computer software. Whether a particular function is performed by hardware or by computer software driving hardware depends on the specific application and design constraints of the technical solution. A person skilled in the art may use a different approach for each specific application to implement the described functions, but such implementation should not be regarded as beyond the scope of the technical solutions of the embodiments of the present disclosure.

In view of above, the present disclosure provides a method for scheduling downlink control information, applied to a network device, including: determining joint downlink control information, the joint downlink control information being determined on basis of two or more pieces of member downlink control information; where each piece of member downlink control information corresponds to scheduling of one data channel, and the joint downlink control information is used to schedule a plurality of data channels corresponding to the two or more pieces of member downlink control information.

In some embodiments, the joint downlink control information includes at least one of: a first type of information field, and a second type of information field. The first type of information field is an information field shared by the two or more pieces of member downlink control information, and the second type of information field is an information field provided for each piece of member downlink control information of the two or more pieces of member downlink control information.

In some embodiments, the first type of information field includes a portion indicated by configuring a third type of information field, or the second type of information field comprises a portion indicated by configuring a third type of information field, or the first type of information field includes a portion indicated by configuring a third type of information field, and the second type of information field comprises a portion indicated by configuring a third type of information field. The third type of information field has at least one of following configurations: the third type of information field having a specified default configuration type, the third type of information field being configured as the first type of information field, and the third type of information field being configured as the second type of information field.

In some embodiments, the method further includes: determining a type of information field included in the joint downlink control information, and sending first indication information, the first indication information being used to indicate the type of information field included in the joint downlink control information.

In some embodiments, the sending the first indication information includes: sending the first indication information based on high-layer signaling.

In some embodiments, the type of information field included in the joint downlink control information includes at least one of: the first type of information field indicated by configuring a third type of information field, and the second type of information field indicated by configuring a third type of information field. The method further includes: sending second indication information, the second indication information being used to indicate that the third type of information field is configured as the first type of information field or that the third type of information field is configured as the second type of information field.

In some embodiments, the second indication information is carried via a media access control control element or an information field in the joint downlink control information.

In some embodiments, the second indication information includes a bitmap for indicating the first type of information field or the second type of information field; and a first bit value of the bitmap indicates that the third type of information field is configured as the first type of information field, and a second bit value of the bitmap indicates that the third type of information field is configured as the second type of information field.

In some embodiments, the type of information field included in the joint downlink control information includes the first type of information field and the second type of information field, the first type of information field and the second type of information field having a first combination order.

In some embodiments, the two or more pieces of member downlink control information include at least one piece of first member downlink control information, and the first combination order includes one of following combination orders:

first type of information fields and second type of information fields are arranged in sequence, and the first type of information fields in the two or more pieces of member downlink control information are arranged sequentially based on an order of first type of information fields in the first member downlink control information; the second type of information fields in the two or more pieces of member downlink control information are arranged sequentially based on an order of second type of information fields in the first member downlink control information; and separately existing information fields are arranged sequentially based on an order of member downlink control information to which the separately existing information fields belong;

first type of information fields, second type of information fields characterizing a same object, and separately existing information fields are arranged sequentially, and the first type of information fields in the two or more pieces of member downlink control information are arranged sequentially based on an order of first type of information fields in the first member downlink control information; the second type of information fields characterizing the same object in the two or more pieces of member downlink control information are arranged in a staggered order; and separately existing information fields in the two or more pieces of member downlink control information are arranged sequentially based on an order of member downlink control information to which the separately existing information fields belong;

second type of information fields characterizing a same object, first type of information fields, and separately existing information fields are arranged sequentially, and the second type of information fields characterizing the same object in the two or more pieces of member downlink control information are arranged in a staggered order; the first type of information fields in the two or more pieces of member downlink control information are arranged sequentially based on an order of first type of information fields in the first member downlink control information; and separately existing information fields in the two or more pieces of member downlink control information are arranged sequentially based on an order of member downlink control information to which the separately existing information fields belong; and separately existing information fields, second type of information fields characterizing a same object, and first type of information fields are arranged sequentially, and separately existing information fields in the two or more pieces of member downlink control information are arranged sequentially based on an order of member downlink control information to which the separately existing information fields belong; the second type of information fields characterizing the same object in the two or more pieces of member downlink control information are arranged in a staggered order; and the first type of information fields in the two or more pieces of member downlink control information are arranged sequentially based on an order of first type of information fields in the first member downlink control information.

In some embodiments, the first combination order is specified by a protocol, or determined by the network device.

In some embodiments, the first combination order is determined by the network device, and the method further includes informing a terminal of the first combination order via high-layer signaling.

In some embodiments, the second indication information is carried in the media access control control element, and the method further includes determining that the terminal has sent feedback information of a data channel carrying the media access control control element.

In some embodiments, the method further includes sending the joint downlink control information.

The present disclosure further provides a method for scheduling downlink control information, applied to a terminal, including: receiving joint downlink control information, the joint downlink control information being determined on basis of two or more pieces of member downlink control information. Each piece of member downlink control information corresponds to scheduling of one data channel, and the joint downlink control information is used to schedule a plurality of data channels corresponding to the two or more pieces of member downlink control information.

In some embodiments, the joint downlink control information includes at least one of: a first type of information field, and a second type of information field. The first type of information field is an information field shared by the two or more pieces of member downlink control information, and the second type of information field is an information field provided for each piece of member downlink control information of the two or more pieces of member downlink control information.

In some embodiments, the first type of information field includes a portion indicated by configuring a third type of information field, or the second type of information field includes a portion indicated by configuring a third type of information field, or the first type of information field includes a portion indicated by configuring a third type of information field, and the second type of information field comprises a portion indicated by configuring a third type of information field. The third type of information field has at least one of following configurations: the third type of information field having a specified default configuration type, the third type of information field being configured as the first type of information field, and the third type of information field being configured as the second type of information field.

In some embodiments, the method further includes receiving first indication information, the first indication information being used to indicate a type of information field included in the joint downlink control information In some embodiments, the receiving the first indication information includes: receiving the first indication information based on high-layer signaling.

In some embodiments, the type of information field included in the joint downlink control information includes at least one of: the first type of information field indicated by configuring a third type of information field, and the second type of information field indicated by configuring a third type of information field. The method further includes: receiving second indication information, the second indication information being used to indicate that the third type of information field is configured as the first type of information field or that the third type of information field is configured as the second type of information field.

In some embodiments, the second indication information is carried via a media access control control element or an information field in the joint downlink control information.

In some embodiments, the second indication information includes a bitmap for indicating the first type of information field or the second type of information field. A first bit value of the bitmap indicates that the third type of information field is configured as the first type of information field, and a second bit value of the bitmap indicates that the third type of information field is configured as the second type of information field.

In some embodiments, the type of information field included in the joint downlink control information includes the first type of information field and the second type of information field, the first type of information field and the second type of information field having a first combination order.

In some embodiments, the two or more pieces of member downlink control information include at least one piece of first member downlink control information, and the first combination order includes one of following combination orders:
  first type of information fields and second type of information fields are arranged in sequence, and the first type of information fields in the two or more pieces of member downlink control information are arranged sequentially based on an order of first type of information fields in the first member downlink control information; the second type of information fields in the two or more pieces of member downlink control information are arranged sequentially based on an order of second type of information fields in the first member downlink control information; and separately existing information fields are arranged sequentially based on an order of member downlink control information to which the separately existing information fields belong;
  first type of information fields, second type of information fields characterizing a same object, and separately existing information fields are arranged sequentially, and the first type of information fields in the two or more pieces of member downlink control information are arranged sequentially based on an order of first type of information fields in the first member downlink control information; the second type of information fields characterizing the same object in the two or more pieces of member downlink control information are arranged in a staggered order; and separately existing information fields in the two or more pieces of member downlink control information are arranged sequentially based on an order of member downlink control information to which the separately existing information fields belong;
  second type of information fields characterizing a same object, first type of information fields, and separately existing information fields are arranged sequentially, and the second type of information fields characterizing the same object in the two or more pieces of member downlink control information are arranged in a staggered order; the first type of information fields in the two or more pieces of member downlink control information are arranged sequentially based on an order of first type of information fields in the first member downlink control information; and separately existing information fields in the two or more pieces of member downlink control information are arranged sequentially based on an order of member downlink control information to which the separately existing information fields belong; and
  separately existing information fields, second type of information fields characterizing a same object, and first type of information fields are arranged sequentially, and separately existing information fields in the two or more pieces of member downlink control information are arranged sequentially based on an order of member downlink control information to which the separately existing information fields belong; the second type of information fields characterizing the same object in the two or more pieces of member downlink control information are arranged in a staggered order; and the first type of information fields in the two or more pieces of member downlink control information are arranged sequentially based on an order of first type of information fields in the first member downlink control information.

In some embodiments, the first combination order is specified by a protocol, or determined by a network device.

In some embodiments, the first combination order is determined by the network device, and the method further includes determining the first combination order via high-layer signaling.

In some embodiments, the second indication information is carried in the media access control control element, and the method further includes: sending feedback information of a data channel carrying the media access control control element.

Figure 7:
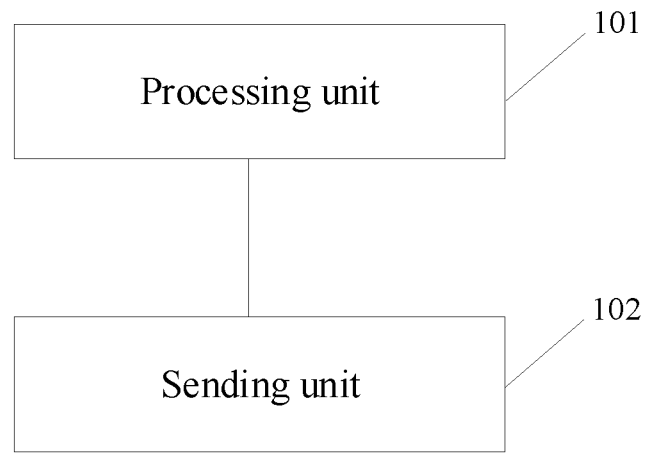
FIG. 7 is a block diagram of an apparatus for scheduling DCI illustrated according to an exemplary embodiment.

FIG. 7 is a block diagram of an apparatus for scheduling DCI illustrated according to an exemplary embodiment. Referring to FIG. 7, an apparatus 100 for scheduling downlink control information includes a processing unit 101.

The processing unit 101 is configured to determine joint DCI, the joint DCI being determined on basis of two or more member DCIs; where each member DCI corresponds to scheduling of one data channel, and the joint DCI is used to schedule a plurality of data channels corresponding to the two or more member DCIs.

In one embodiment, the joint DCI includes a first type of information field, and/or a second type of information field, and/or a third type of information field. The first type of information field is an information field shared by the two or more member DCIs, and the second type of information field is an information field provided for each member DCI of the two or more member DCIs.

In one embodiment, the first type of information field includes a portion indicated by configuring a third type of information field, and/or the second type of information field includes a portion indicated by configuring a third type of information field, the third type of information field having a specified default configuration type, and/or the third type of information field being configured as the first type of information field or the second type of information field.

In one embodiment, the processing unit 101 is further configured to: determine a type of information field included in the joint DCI. The apparatus 100 for scheduling the DCI further includes: a sending unit 102. The sending unit 102 is configured to send first indication information, the first indication information being used to indicate the type of information field included in the joint DCI.

In one embodiment, the sending unit 102 is configured to: send the first indication information based on high-layer signaling.

In one embodiment, the type of information field included in the joint DCI includes the third type of information field, and the sending unit 102 is further configured to: send second indication information, the second indication information being used to indicate that the third type of information field is configured as the first type of information field or that the third type of information field is configured as the second type of information field.

In one embodiment, the second indication information is carried via a MAC CE or an information field in the joint DCI.

In one embodiment, the second indication information includes a bitmap for indicating the first type of information field or the second type of information field. A first bit value of the bitmap indicates that the third type of information field is configured as the first type of information field, and a second bit value of the bitmap indicates that the third type of information field is configured as the second type of information field.

In one embodiment, the type of information field included in the joint downlink control information includes the first type of information field and the second type of information field, the first type of information field and the second type of information field having a first combination order.

In one embodiment, the two or more member DCIs include at least one first member DCI, and the first combination order includes one of following combination orders:
first type of information fields and second type of information fields are arranged in sequence, and the first type of information fields in the two or more member DCIs are arranged sequentially based on an order of first type of information fields in the first member DCI; the second type of information fields in the two or more member DCIs are arranged sequentially based on an order of second type of information fields in the first member DCI; and separately existing information fields in the two or more member DCIs are arranged sequentially based on an order of information fields in member DCI to which the separately existing information fields belong;
first type of information fields, second type of information fields characterizing a same object, and separately existing second type of information fields are arranged sequentially, and the first type of information fields in the two or more member DCIs are arranged sequentially based on an order of first type of information fields in the first member DCI; the second type of information fields characterizing the same object in the two or more member DCIs are arranged in a staggered order; and separately existing second type of information fields in the two or more member DCIs are arranged sequentially based on an order of information fields in member DCI to which the separately existing second type of information fields belong;
second type of information fields characterizing a same object, first type of information fields, and separately existing second type of information fields are arranged sequentially, and the second type of information fields characterizing the same object in the two or more member DCIs are arranged in a staggered order; the first type of information fields in the two or more member DCIs are arranged sequentially based on an order of first type of information fields in the first member DCI; and separately existing second type of information fields in the two or more member DCIs are arranged sequentially based on an order of information fields in member DCI to which the separately existing second type of information fields belong; and
separately existing information fields, second type of information fields characterizing a same object, and first type of information fields are arranged sequentially, and separately existing second type of information fields in the two or more member DCIs are arranged sequentially based on an order of second type of information fields in the first member DCI; the second type of information fields characterizing the same object in the two or more member DCIs are arranged in a staggered order; and the first type of information fields in the two or more member DCIs are arranged sequentially based on an order of first type of information fields in the first member DCI.

In one embodiment, the first combination order is specified by a protocol, or determined by the network device.

In one embodiment, the first combination order is determined by the network device, and the sending unit 102 is configured to inform a terminal of the first combination order via high-layer signaling.

In one embodiment, the second indication information is carried in the MAC CE, and the sending unit 102 is further configured to determine that the terminal has sent feedback information of a data channel carrying the MAC CE.

In one embodiment, the sending unit 102 is configured to send the joint DCI.

Figure 8:
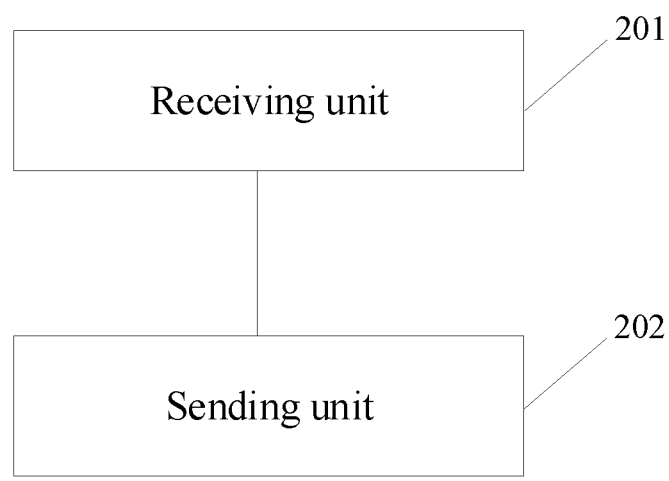
FIG. 8 is a block diagram of an apparatus for scheduling DCI illustrated according to an exemplary embodiment.

FIG. 8 is a block diagram of an apparatus for scheduling DCI illustrated according to an exemplary embodiment. Referring to FIG. 8, an apparatus 200 for scheduling downlink control information includes a receiving unit 201.

The receiving unit 201 is configured to receive joint DCI, the joint DCI being determined on basis of two or more member DCIs; where each member DCI corresponds to scheduling of one data channel, and the joint DCI is used to schedule a plurality of data channels corresponding to the two or more member DCIs.

In one embodiment, the joint DCI includes a first type of information field, and/or a second type of information field, and/or a third type of information field. The first type of information field is an information field shared by the two or more member DCIs, and the second type of information field is an information field provided for each member DCI of the two or more member DCIs.

In one embodiment, the first type of information field includes a portion indicated by configuring a third type of information field, and/or the second type of information field includes a portion indicated by configuring a third type of information field, the third type of information field having a specified default configuration type, and/or the third type of information field being configured as the first type of information field or the second type of information field.

In one embodiment, the receiving unit 201 is further configured to receive first indication information, the first indication information being used to indicate a type of information field included in the joint DCI.

In one embodiment, the receiving unit 201 is configured to receive the first indication information based on high-layer signaling.

In one embodiment, the type of information field included in the joint DCI includes the third type of information field, and the receiving unit 201 is further configured to:
receive second indication information, the second indication information being used to indicate that the third type of information field is configured as the first type of information field or that the third type of information field is configured as the second type of information field.

In one embodiment, the second indication information is carried via a media access control control element or an information field in the joint DCI.

In one embodiment, the second indication information includes a bitmap for indicating the first type of information field or the second type of information field. A first bit value of the bitmap indicates that the third type of information field is configured as the first type of information field, and a second bit value of the bitmap indicates that the third type of information field is configured as the second type of information field.

In one embodiment, the type of information field included in the joint DCI includes the first type of information field and the second type of information field, the first type of information field and the second type of information field having a first combination order.

In one embodiment, the two or more member DCIs include at least one first member DCI, and the first combination order includes one of following combination orders:

first type of information fields and second type of information fields are arranged in sequence, and the first type of information fields in the two or more member DCIs are arranged sequentially based on an order of first type of information fields in the first member DCI; the second type of information fields in the two or more member DCIs are arranged sequentially based on an order of second type of information fields in the first member DCI; and separately existing information fields in the two or more member DCIs are arranged sequentially based on an order of information fields in member DCI to which the separately existing information fields belong;

first type of information fields, second type of information fields characterizing a same object, and separately existing second type of information fields are arranged sequentially, and the first type of information fields in the two or more member DCIs are arranged sequentially based on an order of first type of information fields in the first member DCI; the second type of information fields characterizing the same object in the two or more member DCIs are arranged in a staggered order; and separately existing second type of information fields in the two or more member DCIs are arranged sequentially based on an order of information fields in member DCI to which the separately existing second type of information fields belong;

second type of information fields characterizing a same object, first type of information fields, and separately existing second type of information fields are arranged sequentially, and the second type of information fields characterizing the same object in the two or more member DCIs are arranged in a staggered order; the first type of information fields in the two or more member DCIs are arranged sequentially based on an order of first type of information fields in the first member DCI; and separately existing second type of information fields in the two or more member DCIs are arranged sequentially based on an order of information fields in member DCI to which the separately existing second type of information fields belong; and separately existing information fields, second type of information fields characterizing a same object, and first type of information fields are arranged sequentially, and separately existing second type of information fields in the two or more member DCIs are arranged sequentially based on an order of second type of information fields in the first member DCI; the second type of information fields characterizing the same object in the two or more member DCIs are arranged in a staggered order; and the first type of information fields in the two or more member DCIs are arranged sequentially based on an order of first type of information fields in the first member DCI.

In one embodiment, the first combination order is specified by a protocol, or determined by a network device.

In one embodiment, the first combination order is determined by the network device, and the receiving unit 201 is further configured to determine the first combination order via high-layer signaling.

In one embodiment, the second indication information is carried in the MAC CE, and the apparatus 200 for scheduling DCI further includes a sending unit 202. The sending unit 202 is configured to send feedback information of a data channel carrying the MAC CE.

Regarding the apparatus in the above embodiments, the specific way in which each module performs its operation has been described in detail in the embodiments concerning the method, and will not be described in detail here.

Figure 9:
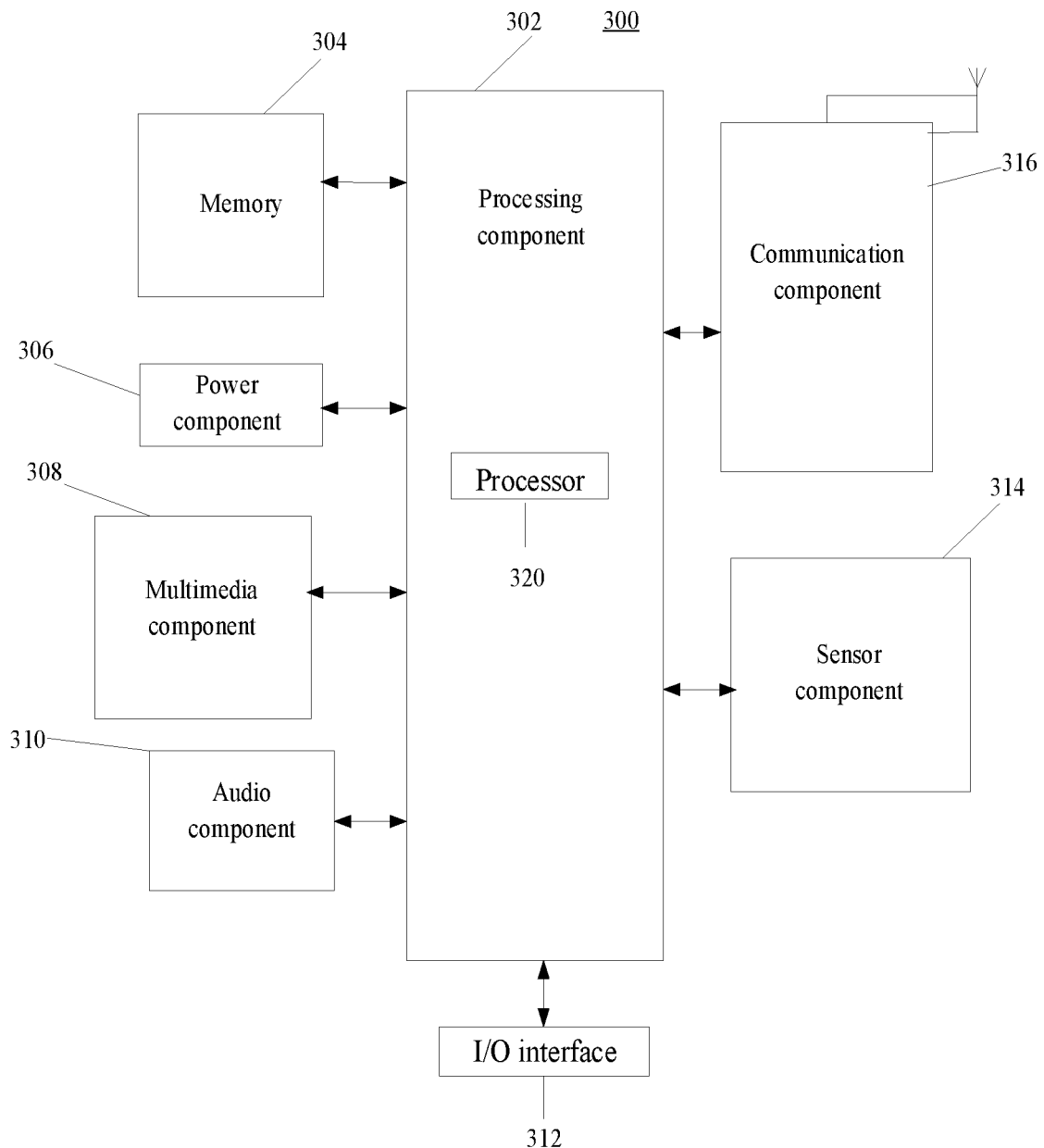
FIG. 9 is a block diagram of a device for scheduling DCI illustrated according to an exemplary embodiment.

FIG. 9 is a block diagram of a device for scheduling DCI illustrated according to an exemplary embodiment. For example, a device 300 may be a cell phone, a computer, a digital broadcast terminal, a message sending and receiving device, a gaming console, a tablet device, a medical device, a fitness device, a personal digital assistant, etc.

Referring to FIG. 9, the device 300 may include one or more of the following components: processing component 302, memory 304, power component 306, multimedia component 308, audio component 310, input/output (I/O) interface 312, sensor component 314, and communication component 316.

The processing component 302 generally controls the overall operation of device 300, such as operations associated with display, telephone call, data communication, camera operation, and recording operations. The processing component 302 may include one or more processors 320 to execute instructions to complete all or some of the steps of the method described above. In addition, the processing component 302 may include one or more modules that facilitate interaction between the processing component 302 and other components. For example, the processing component 302 may include a multimedia module to facilitate interaction between the multimedia component 308 and the processing component 302.

The memory 304 is configured to store various types of data to support operation at the device 300. Examples of such data include instructions for any application or method operating on device 300, contact data, phonebook data, messages, pictures, videos, etc. The memory 304 may be implemented by any type of volatile or non-volatile storage device or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory disk or CD-ROM.

The power component 306 provides power to various components of the device 300. The power component 306 may include a power management system, one or more power sources, and other components associated with generating, managing, and distributing power for the device 300.

The multimedia component 308 includes a screen providing an output interface between the device 300 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensors may not only sense the boundaries of the touch or swipe action, but also detect the duration and pressure associated with the touch or swipe action. In some embodiments, the multimedia component 308 includes a front-facing camera and/or a rear-facing camera. The front-facing camera and/or rear-facing camera may receive external multimedia data when the device 300 is in an operating mode, such as shooting mode or video mode. Each front-facing camera and rear-facing camera may be a fixed optical lens system or have focal length and optical zoom capability.

The audio component 310 is configured to output and/or input audio signals. For example, the audio component 310 includes a microphone (MIC) configured to receive external audio signals when the device 300 is in an operating mode, such as call mode, record mode, and voice recognition mode. The received audio signal may be further stored in memory 304 or sent via the communication component 316. In some embodiments, the audio component 310 further includes a speaker for outputting an audio signal.

The I/O interface 312 provides an interface between the processing component 302 and a peripheral interface module, and the peripheral interface module may be a keypad, click wheel, button, etc. These buttons may include, but are not limited to: a home button, a volume button, a start button, and a lock button.

The sensor component 314 includes one or more sensors for providing a status assessment of various aspects of the device 300. For example, the sensor component 314 may detect an open/closed state of the device 300, the relative positioning of components, such as the components being the display and keypad of the device 300, and the sensor component 314 may also detect a change in position of the device 300 or a component of the device 300, the presence or absence of user contact with the device 300, the orientation or acceleration/deceleration of the device 300 and the temperature change of the device 300. The sensor component 314 may include a proximity sensor configured to detect the presence of a nearby object in the absence of any physical contact. The sensor component 314 may also include a light sensor, such as a CMOS or CCD image sensor, for use in imaging applications. In some embodiments, the sensor component 314 may also include an accelerometer sensor, a gyroscope sensor, a magnetic sensor, a pressure sensor, or a temperature sensor.

The communication component 316 is configured to facilitate communication between the device 300 and other devices by wired or wireless means. The device 300 may access a wireless network based on a communication standard, such as WiFi, 2G or 3G, or a combination thereof. In an exemplary embodiment, the communication component 316 receives broadcast signals or broadcast-related information from an external broadcast management system via a broadcast channel. In an exemplary embodiment, the communication component 316 further includes a near-field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology, and other technologies.

In exemplary embodiments, the device 300 may be implemented by one or more application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, or other electronic components for performing the methods described above.

In exemplary embodiments, there is also provided a non-transitory computer readable storage medium including instructions, such as the memory 304 including instructions, the instructions being executable by the processor 320 of the device 300 to accomplish the methods described above. For example, the non-transitory computer readable storage medium may be ROM, random access memory (RAM), CD-ROM, magnetic tape, floppy disk, and optical data storage device, among others.

Figure 10:
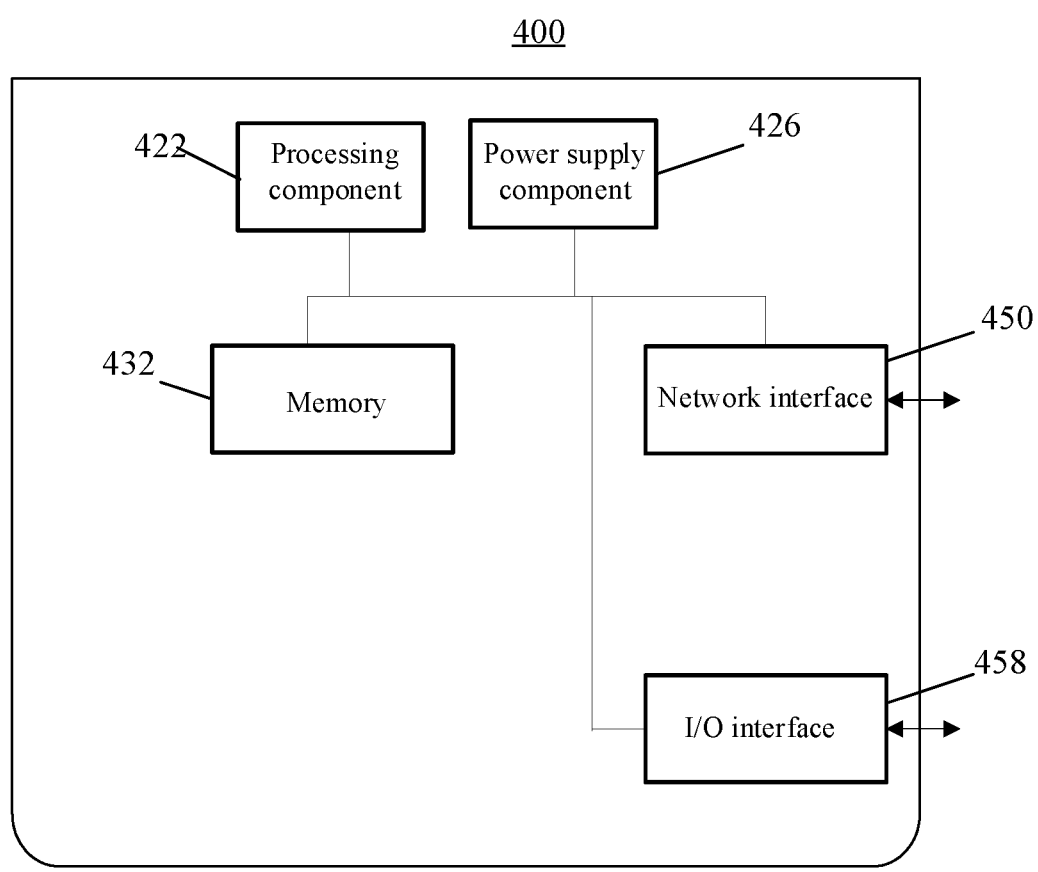
FIG. 10 is a block diagram of a device for scheduling DCI illustrated according to an exemplary embodiment.

FIG. 10 is a block diagram of a device 400 for scheduling DCI illustrated according to an exemplary embodiment. For example, the device 400 may be provided as a server. Referring to FIG. 10, the device 400 includes a processing component 422, which further includes one or more processors, and memory resources represented by memory 432 for storing instructions, such as applications, that may be executed by the processing component 422. The application programs stored in the memory 432 may include one or more modules each corresponding to a set of instructions. Further, the processing component 422 is configured to execute the instructions to perform the methods described above.

The device 400 may also include a power supply component 426 configured to perform power management of the device 400, a wired or wireless network interface 450 configured to connect the device 400 to a network, and an input-output (I/O) interface 458. The device 400 may operate an operating system based on an operating system stored in the memory 432, such as Windows Server™, Mac OS X™, Unix™, Linux™, FreeBSD™, or the like.

In exemplary embodiments, there is also provided a non-transitory computer readable storage medium including instructions, such as a memory 432 including instructions, the instructions being executable by the processing component 422 of the device 400 to accomplish the methods described above. For example, the non-transitory computer readable storage medium may be ROM, random access memory (RAM), CD-ROM, magnetic tape, floppy disk, and optical data storage device, among others.

It will be further understood that the term "plurality" in the present disclosure refers to two or more, and that other quantifiers are similar. The word "and/or" describes the relationship of the associated objects, indicating that three relationships can exist, for example, A and/or B, which can indicate the existence of A alone, A and B together, and B alone. The character "/" generally indicates an "or" relationship between the associated objects before and after the character. The singular forms "a/an", "said" and "the" are also intended to include the plural forms, unless the context clearly indicates otherwise.

It will be further understood that the terms "first", "second", etc. are used to describe various types of information, but that such information should not be limited to these terms. These terms are used only to distinguish information of the same type from one another and do not indicate a particular order or level of importance. In fact, the terms "first" and "second" can be used interchangeably. For example, without departing from the scope of the present disclosure, first information may also be referred to as second information, and similarly, second information may also be referred to as first information.

It will be further understood that although the operations are depicted in the accompanying drawings in a particular order in embodiments of the present disclosure, this should not be construed as requiring that the operations be performed in the particular order shown or in serial order, or that all of the operations shown be performed to obtain the desired results. Multitasking and parallel processing may be advantageous in particular environments.

Other embodiments of the present disclosure will be readily apparent to those skilled in the art from consideration of the specification and practice of the application disclosed herein. This application is intended to cover any modification, use or adaptation of the present disclosure, these modifications, uses or adaptations follow the general principles of the present disclosure and include common knowledge or conventional technical means in the field not disclosed in the present disclosure. The specification and embodiments are to be considered exemplary only, with a true scope and spirit of the present disclosure being indicated by the following claims.

It will be understood that the present disclosure is not limited to the precise construction already described above and illustrated in the accompanying drawings, and that various modifications and changes may be made without departing from its scope. The scope of the present disclosure is limited only by the appended claims.

What is claimed is:

1. A method for scheduling downlink control information, applied to a network device, comprising:
   determining joint downlink control information, based on two or more pieces of member downlink control information,
   wherein each piece of member downlink control information corresponds to scheduling of one data channel, and the joint downlink control information is designed to schedule a plurality of data channels corresponding to the two or more pieces of member downlink control information,
   the joint downlink control information comprises at least one of: a first type of information field, and a second type of information field, and
   the first type of information field is an information field shared by the two or more pieces of member downlink control information, and the second type of information field is an information field provided for each piece of member downlink control information of the two or more pieces of member downlink control information;
   determining a type of information field included in the joint downlink control information, and sending first indication information, the first indication information being designed to indicate the type of information field included in the joint downlink control information,
   wherein the type of information field included in the joint downlink control information comprises at least one of:
   the first type of information field indicated by configuring a third type of information field, and the second type of information field indicated by configuring the third type of information field; and
   sending second indication information, the second indication information being designed to indicate that the third type of information field is configured as the first type of information field or that the third type of information field is configured as the second type of information field.

2. The method of claim 1, wherein:
   the first type of information field comprises a portion indicated by configuring the third type of information field, or
   the second type of information field comprises a portion indicated by configuring the third type of information field, or
   the first type of information field comprises a portion indicated by configuring the third type of information field, and the second type of information field comprises the portion indicated by configuring the third type of information field; and
   wherein the third type of information field comprises at least one of following configurations: the third type of information field having a specified default configuration type, the third type of information field being configured as the first type of information field, and the third type of information field being configured as the second type of information field.

3. The method of claim 1, wherein the second indication information comprises a bitmap for indicating the first type of information field or the second type of information field; and
   a first bit value of the bitmap indicates that the third type of information field is configured as the first type of information field, and a second bit value of the bitmap indicates that the third type of information field is configured as the second type of information field.

4. The method of claim 1, wherein the type of information field included in the joint downlink control information comprises the first type of information field and the second type of information field, the first type of information field and the second type of information field having a first combination order.

5. The method of claim 4, wherein the two or more pieces of member downlink control information comprise at least one piece of first member downlink control information, and the first combination order comprises one of following combination orders:
   first type of information fields and second type of information fields are arranged in sequence, and the first type of information fields in the two or more pieces of member downlink control information are arranged sequentially based on an order of first type of information fields in the first member downlink control information; the second type of information fields in the two or more pieces of member downlink control information are arranged sequentially based on an order of second type of information fields in the first member downlink control information; and separately existing information fields in the two or more pieces of member downlink control information are arranged sequentially based on an order of information fields in member downlink control information to which the separately existing information fields belong;
   first type of information fields, second type of information fields characterizing a same object, and separately existing information fields are arranged sequentially, and the first type of information fields in the two or more pieces of member downlink control information are arranged sequentially based on an order of first type of information fields in the first member downlink control information; the second type of information fields characterizing the same object in the two or more pieces of member downlink control information are arranged in a staggered order; and separately existing information fields in the two or more pieces of member downlink control information are arranged sequentially based on an order of information fields in member downlink control information to which the separately existing information fields belong;

second type of information fields characterizing a same object, first type of information fields, and separately existing information fields are arranged sequentially, and the second type of information fields characterizing the same object in the two or more pieces of member downlink control information are arranged in a staggered order; the first type of information fields in the two or more pieces of member downlink control information are arranged sequentially based on an order of first type of information fields in the first member downlink control information; and separately existing information fields in the two or more pieces of member downlink control information are arranged sequentially based on an order of information fields in member downlink control information to which the separately existing information fields belong; and separately existing information fields, second type of information fields characterizing a same object, and first type of information fields are arranged sequentially, and separately existing information fields in the two or more pieces of member downlink control information are arranged sequentially based on an order of information fields in member downlink control information to which the separately existing information fields belong; the second type of information fields characterizing the same object in the two or more pieces of member downlink control information are arranged in a staggered order; and the first type of information fields in the two or more pieces of member downlink control information are arranged sequentially based on an order of first type of information fields in the first member downlink control information.

6. The method of claim 1, further comprising:
sending the joint downlink control information.

7. A method for scheduling downlink control information, applied to a terminal, comprising:
receiving joint downlink control information based on two or more pieces of member downlink control information,
wherein each piece of member downlink control information corresponds to scheduling of one data channel, and the joint downlink control information is designed to schedule a plurality of data channels corresponding to the two or more pieces of member downlink control information,
the joint downlink control information comprises at least one of: a first type of information field, and a second type of information field, and
the first type of information field is an information field shared by the two or more pieces of member downlink control information, and the second type of information field is an information field provided for each piece of member downlink control information of the two or more pieces of member downlink control information;
receiving first indication information, the first indication information being designed to indicate a type of information field included in the joint downlink control information, and
wherein the type of information field included in the joint downlink control information comprises at least one of: the first type of information field indicated by configuring a third type of information field, and the second type of information field indicated by configuring the third type of information field; and
receiving second indication information, the second indication information being designed to indicate that the third type of information field is configured as the first type of information field or that the third type of information field is configured as the second type of information field.

8. The method of claim 7, wherein:
the first type of information field comprises a portion indicated by configuring the third type of information field, or
the second type of information field comprises a portion indicated by configuring the third type of information field, or
the first type of information field comprises a portion indicated by configuring the third type of information field, and the second type of information field comprises a portion indicated by configuring the third type of information field; and
wherein the third type of information field comprises at least one of following configurations: the third type of information field having a specified default configuration type, the third type of information field being configured as the first type of information field, and the third type of information field being configured as the second type of information field.

9. The method of claim 7, wherein the second indication information comprises a bitmap for indicating the first type of information field or the second type of information field; and
a first bit value of the bitmap indicates that the third type of information field is configured as the first type of information field, and a second bit value of the bitmap indicates that the third type of information field is configured as the second type of information field.

10. The method of claim 7, wherein the type of information field included in the joint downlink control information comprises the first type of information field and the second type of information field, the first type of information field and the second type of information field having a first combination order.

11. The method of claim 10, wherein the two or more pieces of member downlink control information comprise at least one piece of first member downlink control information, and the first combination order comprises one of following combination orders:
first type of information fields and second type of information fields are arranged in sequence, and the first type of information fields in the two or more pieces of member downlink control information are arranged sequentially based on an order of first type of information fields in the first member downlink control information; the second type of information fields in the two or more pieces of member downlink control information are arranged sequentially based on an order of second type of information fields in the first member downlink control information; and separately existing information fields in the two or more pieces of member downlink control information are arranged sequentially based on an order of information fields in member downlink control information to which the separately existing information fields belong;
first type of information fields, second type of information fields characterizing a same object, and separately existing information fields are arranged sequentially, and the first type of information fields in the two or more pieces of member downlink control information are arranged sequentially based on an order of first type of information fields in the first member downlink control information; the second type of information fields characterizing the same object in the two or more pieces of member downlink control information are arranged in a staggered order; and separately existing information fields in the two or more pieces of member downlink control information are arranged sequentially based on an order of information fields in member downlink control information to which the separately existing information fields belong;

second type of information fields characterizing a same object, first type of information fields, and separately existing information fields are arranged sequentially, and the second type of information fields characterizing the same object in the two or more pieces of member downlink control information are arranged in a staggered order; the first type of information fields in the two or more pieces of member downlink control information are arranged sequentially based on an order of first type of information fields in the first member downlink control information; and separately existing information fields in the two or more pieces of member downlink control information are arranged sequentially based on an order of information fields in member downlink control information to which the separately existing information fields belong; and separately existing information fields, second type of information fields characterizing a same object, and first type of information fields are arranged sequentially, and separately existing information fields in the two or more pieces of member downlink control information are arranged sequentially based on an order of information fields in member downlink control information to which the separately existing information fields belong; the second type of information fields characterizing the same object in the two or more pieces of member downlink control information are arranged in a staggered order; and the first type of information fields in the two or more pieces of member downlink control information are arranged sequentially based on an order of first type of information fields in the first member downlink control information.

12. The method of claim 7, wherein the second indication information is carried in a media access control control element, and the method further comprises:

sending feedback information of a data channel carrying the media access control control element.

13. A device for scheduling downlink control information, comprising:

a processor; and a memory for storing instructions executable by the processor;

wherein the processor is configured to:

determine joint downlink control information based on two or more pieces of member downlink control information, wherein each piece of member downlink control information corresponds to scheduling of one data channel, and the joint downlink control information is designed to schedule a plurality of data channels corresponding to the two or more pieces of member downlink control information, the joint downlink control information comprises at least one of: a first type of information field, and a second type of information field, and the first type of information field is an information field shared by the two or more pieces of member downlink control information, and the second type of information field is an information field provided for each piece of member downlink control information of the two or more pieces of member downlink control information;

determine a type of information field included in the joint downlink control information, and send first indication information, the first indication information being designed to indicate the type of information field included in the joint downlink control information, wherein the type of information field included in the joint downlink control information comprises at least one of: the first type of information field indicated by configuring a third type of information field, and the second type of information field indicated by configuring the third type of information field; and send second indication information, the second indication information being designed to indicate that the third type of information field is configured as the first type of information field or that the third type of information field is configured as the second type of information field.

14. A non-transitory computer readable storage medium, wherein instructions in the storage medium, when executed by a processor of a network device, cause the network device to perform the method for scheduling downlink control information of claim 1.

* * * * *